United States Patent [19]
Takano et al.

[11] Patent Number: 5,585,075
[45] Date of Patent: Dec. 17, 1996

[54] CATALYST LOADING STRUCTURE AND A LOADING METHOD FOR A REACTOR

[75] Inventors: Jun-ichi Takano; Nobuyoshi Sawamura, both of Higashimurayama, Japan

[73] Assignee: Softard Industries Co., Ltd., Tokyo, Japan

[21] Appl. No.: 234,809

[22] Filed: Apr. 28, 1994

[51] Int. Cl.$^6$ .................. B01J 8/08; B01J 21/04
[52] U.S. Cl. ............... 422/219; 422/311; 502/439; 502/514
[58] Field of Search ............... 422/211, 213, 422/218, 219, 220, 221, 311, 312; 502/439, 514

[56] References Cited

U.S. PATENT DOCUMENTS

| | | | |
|---|---|---|---|
| 2,893,852 | 7/1959 | Montgomery | 422/220 |
| 2,976,132 | 3/1961 | Dinwiddle et al. | 422/220 |
| 3,249,405 | 5/1966 | Waddill | 422/219 X |
| 3,376,109 | 4/1968 | Stedman | 422/218 X |
| 3,423,185 | 1/1969 | Ballard et al. | 422/220 |
| 4,225,562 | 9/1980 | Anderson | 422/188 |
| 4,239,614 | 12/1980 | Hutchings | 208/108 |
| 4,313,908 | 2/1982 | Gupta | 422/111 |
| 4,402,349 | 9/1983 | Engert et al. | 141/9 |
| 4,411,870 | 10/1983 | Kroushl et al. | 422/188 |
| 4,421,723 | 12/1983 | Farnham | 422/218 |

*Primary Examiner*—Christopher Kim
*Attorney, Agent, or Firm*—Lowe, Price, LeBlanc & Becker

[57] ABSTRACT

The first step, wherein a catalyst is built up in predetermined positions by a catalyst loading means disposed inside a reactor to form said plurality of built-up sections only by said predetermined height, and the second step, wherein the position or direction for releasing the catalyst of said loading means is changed in accordance with the height of the charged catalyst, are alternately repeated to fill said reactor with a predetermined quantity of said catalyst. In the first step, the loading density of the catalyst to be charged into an area, which is not in contact with a cylindrical side wall, is reduced or a catalyst having a larger particle diameter than that of the catalyst to be charged into an area, which is in contact with the cylindrical side wall, is used for the catalyst to be charged into the area, which is not in contact with the cylindrical side wall, or other similar approach is taken in order to securely reduce the flow resistance of the area which is not in contact with the cylindrical side wall and to make the flow resistance of the catalyst charged in the area, which is not in contact with the side wall of the reactor, nearly equal to the flow resistance of the catalyst charged in the area which is in contact with the side wall of the reactor, thereby preventing the deflected-flow phenomenon, wherein a fluid flows always deflecting toward the side wall of said reactor, from occurring.

13 Claims, 13 Drawing Sheets

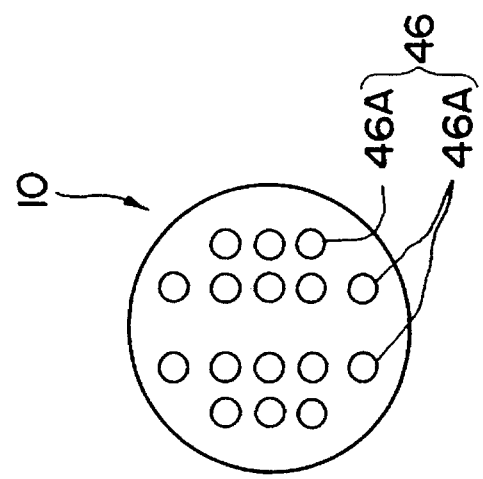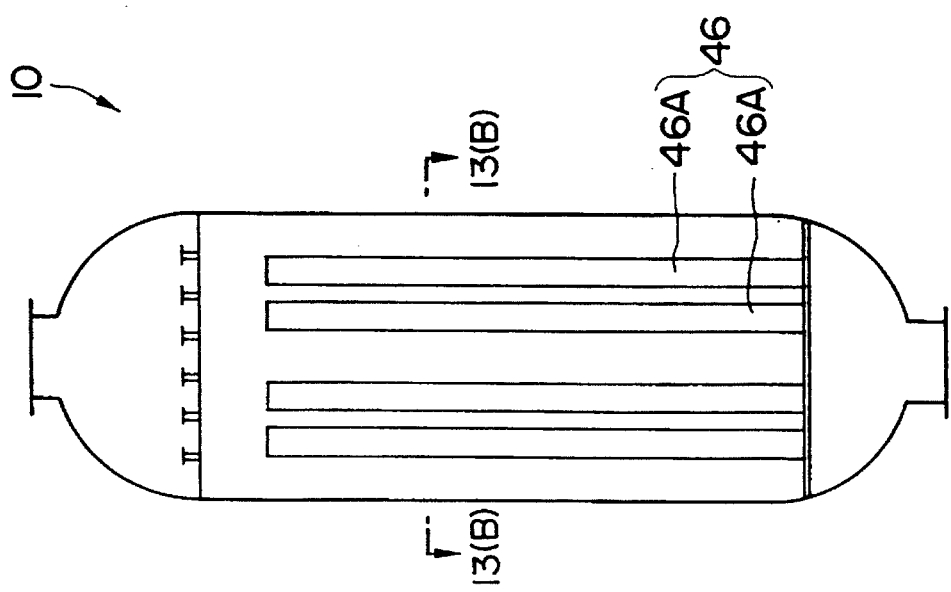

CATALYST LOADING STRUCTURE AND A LOADING METHOD FOR A REACTOR

BACKGROUND OF THE INVENTION

1. Field of the Invention

The present invention relates to a catalyst loading structure and a catalyst loading method for a reactor which is used in oil refining equipment, chemical industry equipment and the like.

2. Description of the Related Art

Conventionally, in a field of oil refining, chemical industry and the like, diverse catalysts are used to accelerate various chemical reactions, and reactors are extensively used to utilize such catalysts.

As a commonly used reactor, there is a cylindrical type, inside thereof being charged with a granular catalyst. For instance, a cylindrical reactor is installed and a liquid, gas or a mixture of the former two is supplied as a material from one end thereof and let pass through the catalyst to bring the material into contact with the catalyst, then the material, which has undergone a reaction, is taken out from the other end.

In such a reactor, a pressure drop is lower in an area along a side wall than in the catalyst. Hence, the material in the reactor develops the so-called deflected-flow (channeling) phenomenon wherein the material flows deflecting from the central area of the reactor to the side wall.

The deflected-flow phenomenon tends to leave the catalyst at the central area unused and it may cause the catalyst to solidify depending on an operating condition in the absence of the material passing through the catalyst. Furthermore, such solidification adds to the maldistribution of the material and the catalyst, which has solidified in the reactor, cannot be removed unless it is crushed when replacing the catalyst, posing a problem of troublesome replacing work of the used catalyst.

It is an object of the present invention to provide a catalyst loading structure and a catalyst loading method for a reactor which make it difficult for the deflected-flow phenomenon to take place.

SUMMARY OF THE INVENTION

The first invention of the present invention is a catalyst loading structure for a reactor, which lets a fluid to be subjected to a chemical reaction pass through a cylindrical interior extending vertically and accelerates the chemical reaction of the fluid by a granular catalyst charged inside, the structure comprising an outer built-up section, wherein the catalyst is vertically built up in an outside area which contacts the side wall of the reactor, and an inner built-up section, wherein the catalyst is vertically built up inside the outer built-up section, and a flow resistance of the inner built-up section being reduced to a value which is nearly equal to the flow resistance of the outer built-up section.

In this case, the flow resistance refers to the flow difficulty of a fluid when the fluid is let pass through a catalyst charged.

In the first invention of the present invention, the flow resistance of the inner built-up section which is not in contact with the side wall of the reactor is nearly equal to the flow resistance of the outer built-up section which is in contact with the side wall of the reactor; therefore, the fluid in the reactor does not flow, deflecting toward the side wall as it used to do so and the fluid evenly flows in a plane cross section of the reactor, and the deflected-flow phenomenon, wherein the fluid flow is deflected, no longer takes place.

The second invention of the present invention achieves the catalyst loading structure for a reactor of the first invention mentioned above.

Specifically, the second invention is a catalyst loading method for a reactor, wherein, in order to charge a catalyst into a reactor to let a fluid to be subjected to a chemical reaction run through a vertically extending cylindrical interior thereby accelerating the chemical reaction of the fluid by a granular catalyst charged inside; the catalyst is charged by using a loading means designed to release the catalyst whereby forming an outer built-up section, wherein the catalyst is vertically built up in the outside area, which is in contact with the side wall of the reactor, and an inner built-up section, wherein the catalyst is vertically built up inside the outer built-up section, and a flow resistance of the inner built-up section is reduced to a value which is nearly equal to the flow resistance of the outer built-up section; the method comprising the first step wherein loading of the catalyst is begun with either the outer built-up section or the inner built-up section and the outer built-up section and the inner built-up section are formed only to a predetermined height, and the second step wherein a position or a direction for releasing the catalyst of the loading means is changed in accordance with the height of the charged catalyst, the first step and the second step being repeated alternately in accordance with the height of the reactor, thus filling the reactor with the catalyst.

According to the second invention of the present invention, in the first step, a timing for building up the catalyst in the outer built-up section and the timing for building up the catalyst in the inner built-up section are set separately, making it possible to provide the outer built-up section with a different catalyst loading density from that of the inner built-up section and to fill the outer built-up section with a different catalyst from that of the inner built-up section, or making it possible to fill both the outer built-up section and the inner built-up section with the catalyst even when only the inner built-up section is provided with a rectifying section, which vertically partitions the inner built-up section.

Thus, the flow resistance of the inner built-up section can be securely reduced and it becomes easy to render the flow resistance of the catalyst charged in the area, which is not in contact with the side wall of the reactor, nearly equal to the flow resistance of the catalyst charged in the area, which is in contact with the side wall of the reactor, allowing the catalyst loading structure of the first invention to be realized securely.

BRIEF DESCRIPTION OF THE DRAWINGS

FIG. 13 (A) and FIG. 13 (B) are cross-sectional views which illustrate another modification of the reactor of the 3rd embodiment.

DETAILED DESCRIPTION OF THE PREFERRED EMBODIMENT(S)

The following describes the embodiments of the present invention with reference to the drawings.

Figure 1:
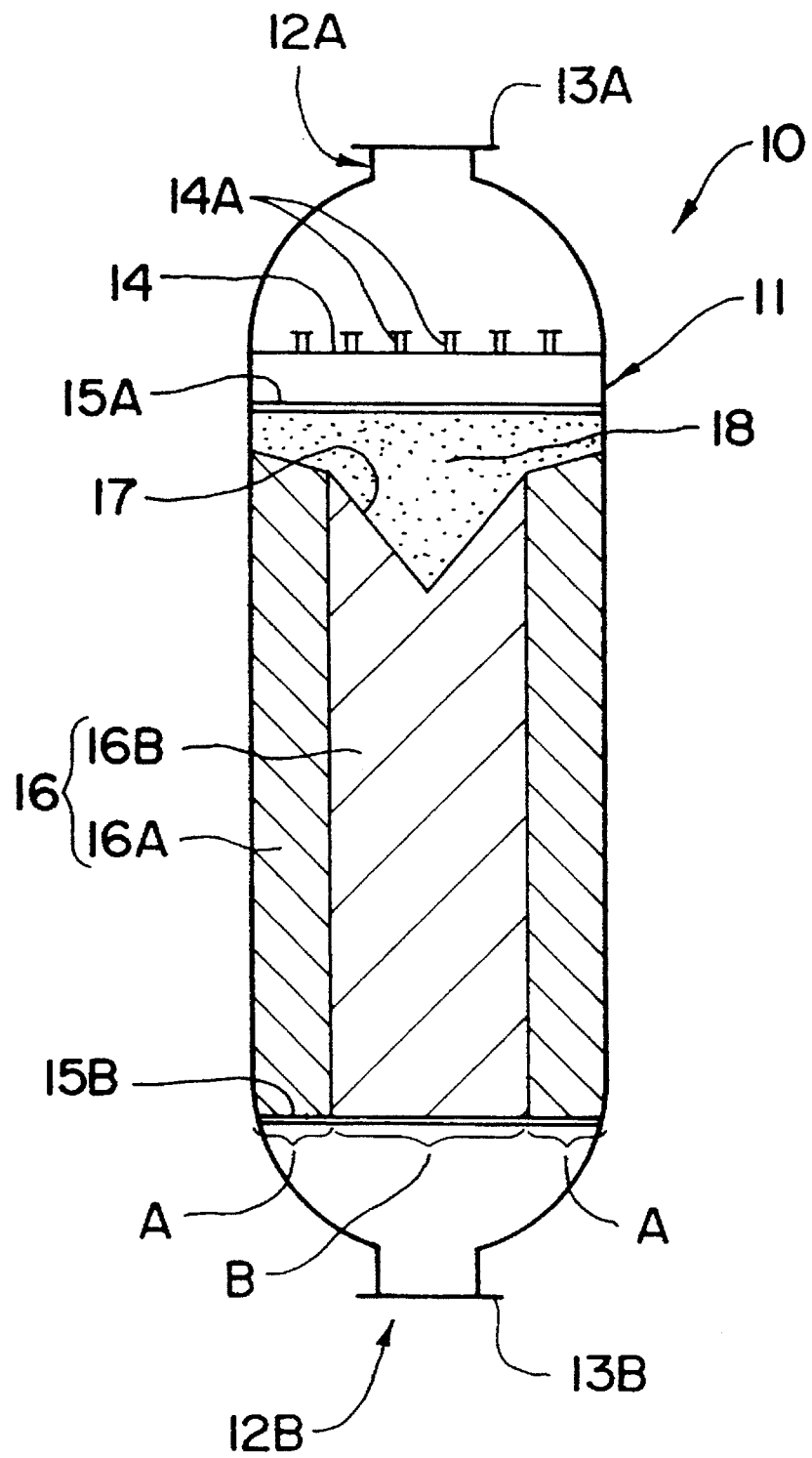
FIG. 1 is a cross-sectional view which shows a reactor of the 1st embodiment of the present invention.

FIG. 1 shows a reactor 10 of the 1st embodiment related to the first invention of the present invention, the reactor 10 having a cylindrical main body 11 which is vertically long.

Top and bottom end sections of the main body 11 are formed into semispherical shapes, the top end section being provided with a connection port 12A, through which a material such as a liquid or a gas is introduced, and the bottom end section being provided with a connection port 12B, through which a material, which has undergone reaction, is drawn out. The connection ports 12A and 12B are provided with flanges 13A and 13B, respectively, for connection with external pipes.

A distribution tray 14, which is approximately shaped like a flat plate, is horizontally installed inside the top end section of the main body 11. A plurality of chimneys 14A are equidistantly provided on a top surface of the distribution tray 14. Each chimney 14A is a cylindrical body which is trimmed to a predetermined height; the upper and lower spaces of the distribution tray 14 are communicated through these chimneys 14A.

Below the distribution tray 14 and above the aforesaid connection port 12B are provided catalyst holding layers 15A and 15B, respectively, wherein granular materials are built up.

As the granular material for the catalyst holding layer 15A, a spherical material such as alumina and ceramic may be employed; as the granular material for the catalyst holding layer 15B, a "support catalyst" or the like, which has a larger particle diameter, may be employed in addition to spherical materials including alumina and ceramic. The catalyst holding layer 15B is deposited on a supporting member (not shown) which is horizontally installed between the side walls near the bottom of the reactor 10.

The use of a structure, wherein a catalyst 16 is placed between the catalyst holding layers 15A and 15B, prevents the catalyst 16 from scattering out of the catalyst holding layers 15A and 15B when a fluid runs inside the reactor 10.

A density of the catalyst 16 differs between the outer built-up section A, which is in contact with the side wall of the main body 11 and which has a donut-shaped plane cross section, and the inner built-up section B which provides the inside of the outer built-up section A and which is not in contact with the side wall of the main body 11, a catalyst 16A of the outer built-up section A being charged with a higher density than a catalyst 16B of the inner built-up section B.

The loading density of the catalyst 16A ranges from 105% to 120% of the loading density of the catalyst 16B. To be specific, when the reactor 10 is a desulfurizing or demetalizing reactor for removing a sulfur content or metal content from heavy oil, the loading density of the catalyst 16A of the outer built-up section A should range from 550 kg/m$^3$ to 750 kg/m$^3$.

Further, if the reactor 10 is filled with a decomposing catalyst which separates gasoline, light oil or the like from heavy oil, then the loading density of the catalyst 16A of the outer built-up section A should range from 700 kg/m$^3$ to 1000 kg/m$^3$.

At a top central part of the catalyst 16 is formed a concave section 17 which is recessed at an angle of repose. In the concave section 17 is provided with a shape retainer 18 which is shaped like an inverted cone and which is filled with a granular filler to retain the shape thereof.

As the filler for the shape retainer 18, a filler, which has the same or similar function as that of the catalyst and a larger particle diameter than that of the catalyst 16 to provide a lower pressure drop, may be used.

Figure 2:
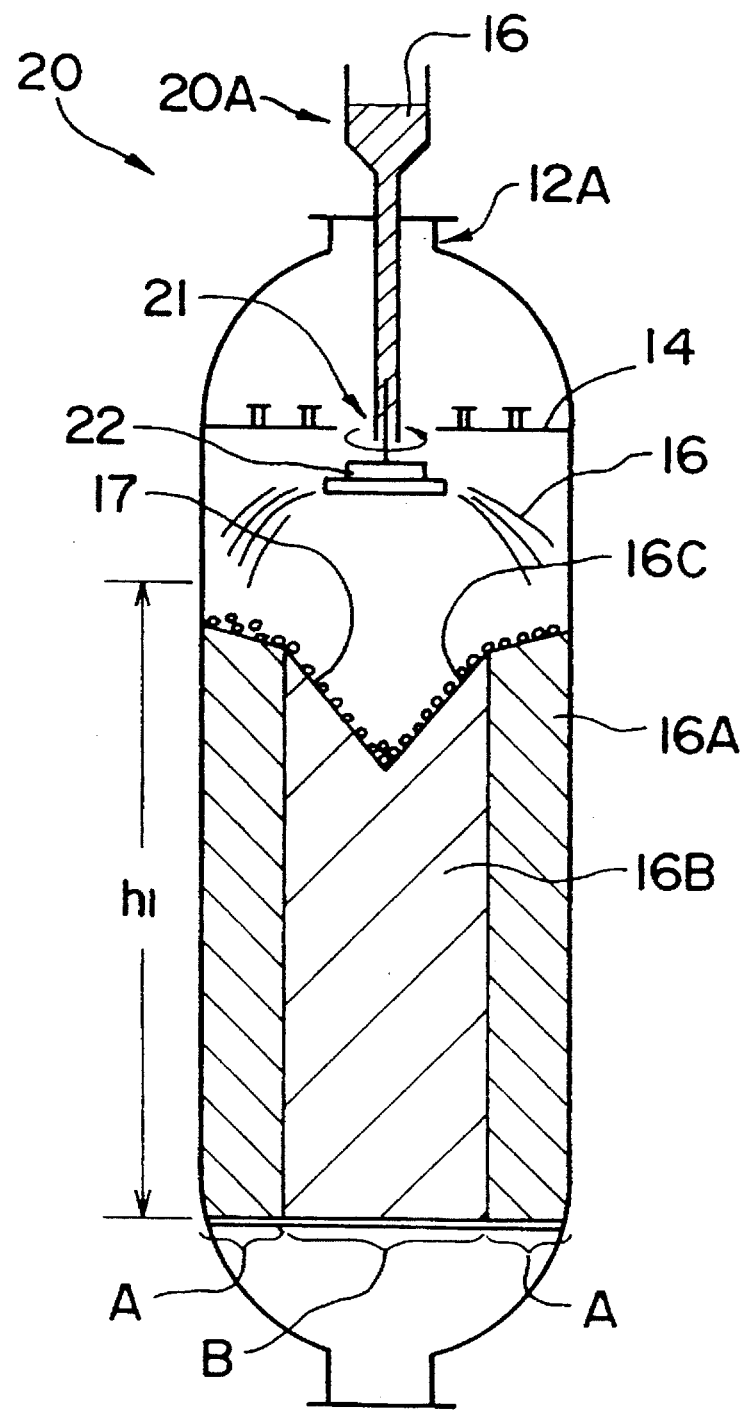
FIG. 2 is a view which illustrates the catalyst loading method for the reactor of the 1st embodiment.

In such an embodiment, as shown in FIG. 2, a rotary-disc catalyst loading apparatus 20 is employed as the loading means of the catalyst 16.

The catalyst loading apparatus 20 is equipped with a hopper 20A filled with the catalyst 16; a bottom end of the hopper 20A extends downward, with a disloading port 21 provided at a distal end thereof.

Right below the disloading port 21 is provided a rotary disc 22. The rotary disc 22 is rotated by an air motor or the like at the time of loading of the catalyst 16. The number of revolutions of the rotary disc 22 can be continuously changed in accordance with the height of the charged catalyst 16.

A procedure for loading the catalyst 16 will now be described.

First, the connection port 12A is opened, then a part of the distribution tray 14 is removed to allow the catalyst 16 to be poured into the reactor 10. Next, as shown in FIG. 2, the disloading port 21 of the catalyst loading apparatus 20 is inserted into the reactor 10.

The catalyst 16 is forcibly built up into a cylindrical shape along the inner surface of the reactor 10 by allowing the catalyst 16 to be discharged through the disloading port 21 with the rotary disc 22 being rotated. This enables the catalyst 16 to be charged with a high density due to the centrifugal force generated by the rotation of the disc 22 and the impact force generated by the drop from a height, thus forming the outer built-up section A by the catalyst 16A which has gained the high density.

In this case, of the catalyst 16, which has been built up cylindrically, a part of the catalyst on the top of the outer built-up section A becomes a catalyst 16C which naturally falls along a slope of the concave section 17. The catalyst 16C is poured into the cylindrical interior to provide the catalyst 16B while maintaining the low density thereof. This enables the catalyst 16B to be charged with the low bulk density and the inner built-up section B is formed by this catalyst layer 16B.

The first step is implemented as described above, then the second step, wherein the number of revolutions of the rotary disc 22 is increased to move upward the direction of disloading the catalyst 16, is carried out each time the catalyst 16A is built up to the predetermined height.

The loading of the catalyst 16 is continued by alternately carrying out the first and second steps, the loading of the catalyst 16 is stopped when the outer built-up section A reaches a predetermined height h1, then the catalyst loading apparatus 20 is removed.

By this time, the concave section 17 of an angle of repose, which is recessed like an ant lion's hole, has been formed in the top of the charged catalyst 16. To maintain the shape with the angle of repose, the concave section 17 is filled with the filler to form the shape retainer 18. Then, the catalyst holding layer 15A is formed on the shape retainer 18 and openings of the distribution tray 14 and the flange 13A are closed. This completes the loading work.

According to the embodiment described above, the following effects will be obtained.

The catalyst layer 16 is forcibly built up into a cylindrical shape along the inner surface of the reactor 10 and the cylindrical interior is filled with the catalyst 16C which naturally falls along the slope of the concave section 17 from the top of the cylindrical built-up section; therefore, the outer built-up section A consisting of the high-density catalyst layer 16A, the inner built-up section B consisting of the catalyst layer 16B, which maintains the low density, and the concave section 17, which is recessed at the angle of repose, are automatically formed.

Further, the catalyst 16 is charged with the rotary disc 22 rotating and the catalyst 16 is charged utilizing the centrifugal force produced by the rotation of the disc 22 and the impact force produced by the drop from the height; therefore, the density of the catalyst 16A of the outer built-up section A can be made significantly higher than that of the catalyst 16B of the inner built-up section B.

In addition, the catalyst 16 of the outer built-up section A is charged with a higher density than that of the inner built-up section B and the concave section 17, which is recessed at the angle of repose, is formed; therefore, the difference in loading density makes the pressure drop of the outer built-up section A relatively larger and a distance of the passage of the material is shortened, leading to a lower pressure drop of the inner built-up section B. As a result, the pressure drop of the outer built-up section A becomes almost equal to that of the inner built-up section B, thus preventing the maldistribution.

The present invention is not limited to the first embodiment described above, but it also comprises modifications to be shown below.

Specifically, the reactor is not limited to the reactor 10, wherein the material flows from top to bottom, but it may be an up-flow type wherein the material flows from bottom to top.

Further, the reactor 10 does not necessarily require the catalyst holding layer 15A and the reactor may omit the catalyst holding layer 15A.

Likewise, the catalyst loading method is not restricted to the method, wherein the number of revolutions of the rotary disc 22 is increased stepwise each time the catalyst 16A is built up to the predetermined height; instead, the catalyst 16 may be charged while continuously increasing the number of revolutions of the rotary disc 22 in accordance with the height of the charged catalyst 16.

Moreover, the following method may be adopted as the catalyst loading method.

Figure 3:
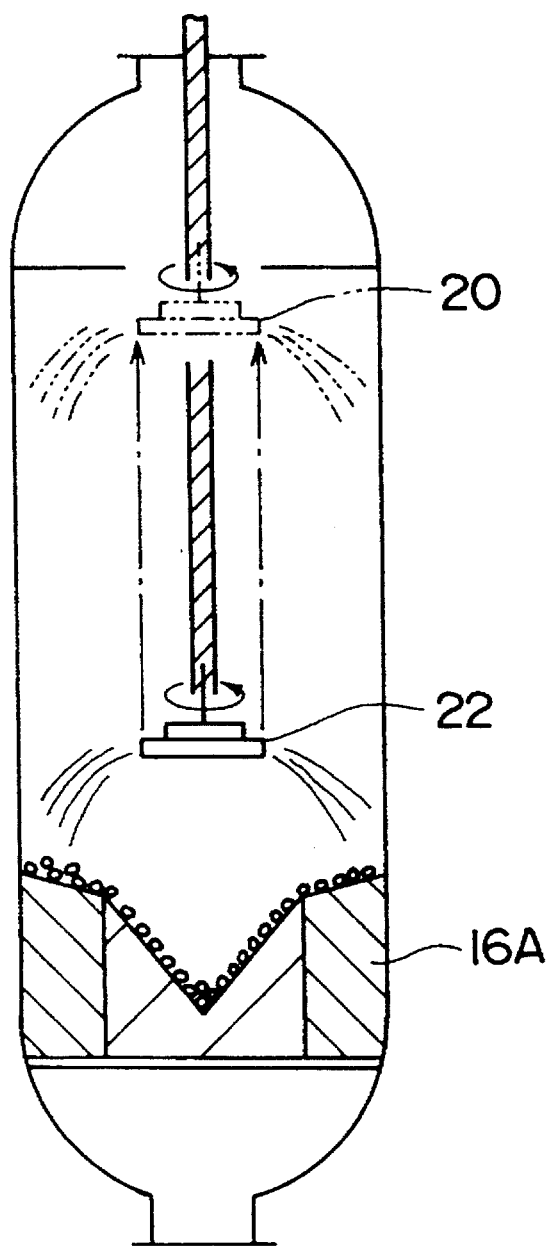
FIG. 3 is a view which illustrates the 1st modification of the catalyst loading method for the reactor of the 1st embodiment.

For instance, the catalyst loading apparatus 20 is set beforehand so that the rotary disc 22 rotates at a constant number of revolutions, and as shown in FIG. 3, the position of the rotary disc 22 is raised by a predetermined height for loading each time the catalyst 16A is built up to the predetermined height.

Figure 4:
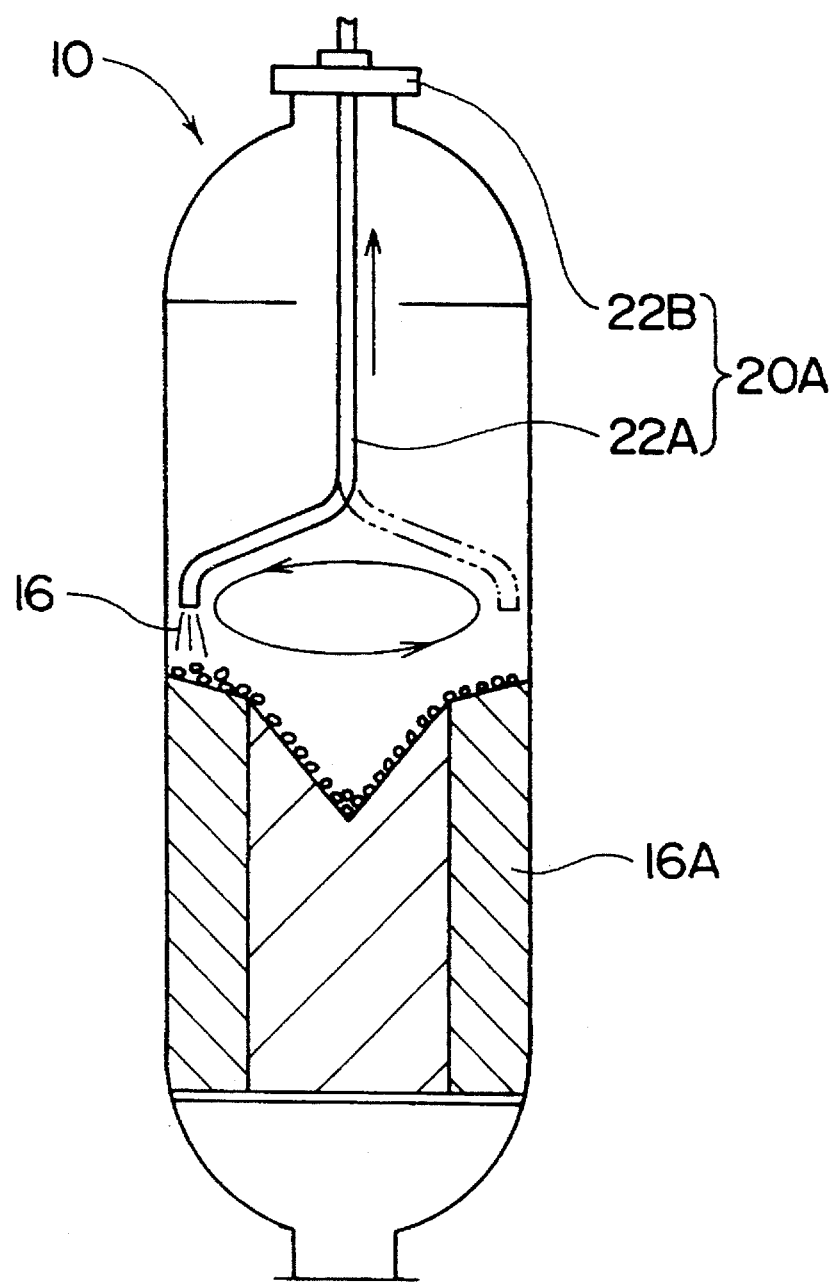
FIG. 4 is a view which illustrates the 2nd modification of the catalyst loading method for the reactor of the 1st embodiment.

Additionally, in place of the rotary disc 22, as shown in FIG. 4, a crank-shaped pipe 22A and a beating apparatus 22B, which is a supporting means wherein one end of the crank-shaped pipe 22A is journaled in a central axial position of the reactor 10 and the other end is allowed to rotate along the inner surface of the reactor 10, may be provided, and the pipe 22A may be moved upward each time the catalyst 16A is built up to the predetermined height by using the catalyst loading apparatus 20A, which builds the catalyst 16 up along the inner surface of the reactor 10 by continuously supplying the catalyst 16 into the pipe 22A while rotating the pipe.

Figure 5:
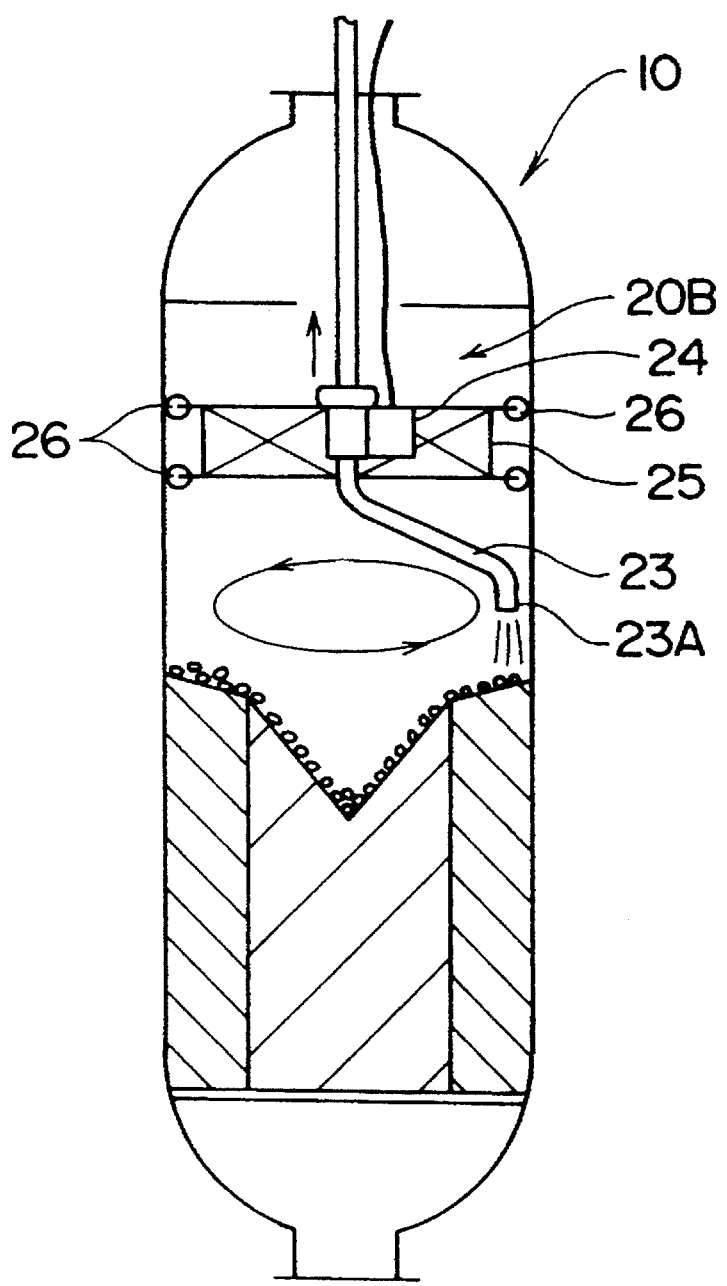
FIG. 5 is a view which illustrates the 3rd modification of the catalyst loading method for the reactor of the 1st embodiment.

Furthermore, as the catalyst loading apparatus as shown in FIG. 5, a catalyst loading apparatus 20B, which is equipped with a pipe 23 which is allowed to rotate along the inner surface of the reactor 10, a hydraulic motor 24 which is a driving means for rotating the pipe 23, a frame 25 which supports the pipe 23 rotatably and on which the hydraulic motor 24 is installed, wheels 26 which allows the frame 25 to moved only in the vertical direction of the reactor 10, and a hose 27 which connects a catalyst disloading port 23A with an external catalyst container of the reactor 10, may be used, and the opening 23A of the pipe 23 may serve as the catalyst disloading port to perform the loading with the catalyst 16 which is discharged through the port 23A. In this case, the catalyst loading apparatus 20B itself is moved upward in the second step each time the catalyst 16A is built up to the predetermined height.

Figure 6:
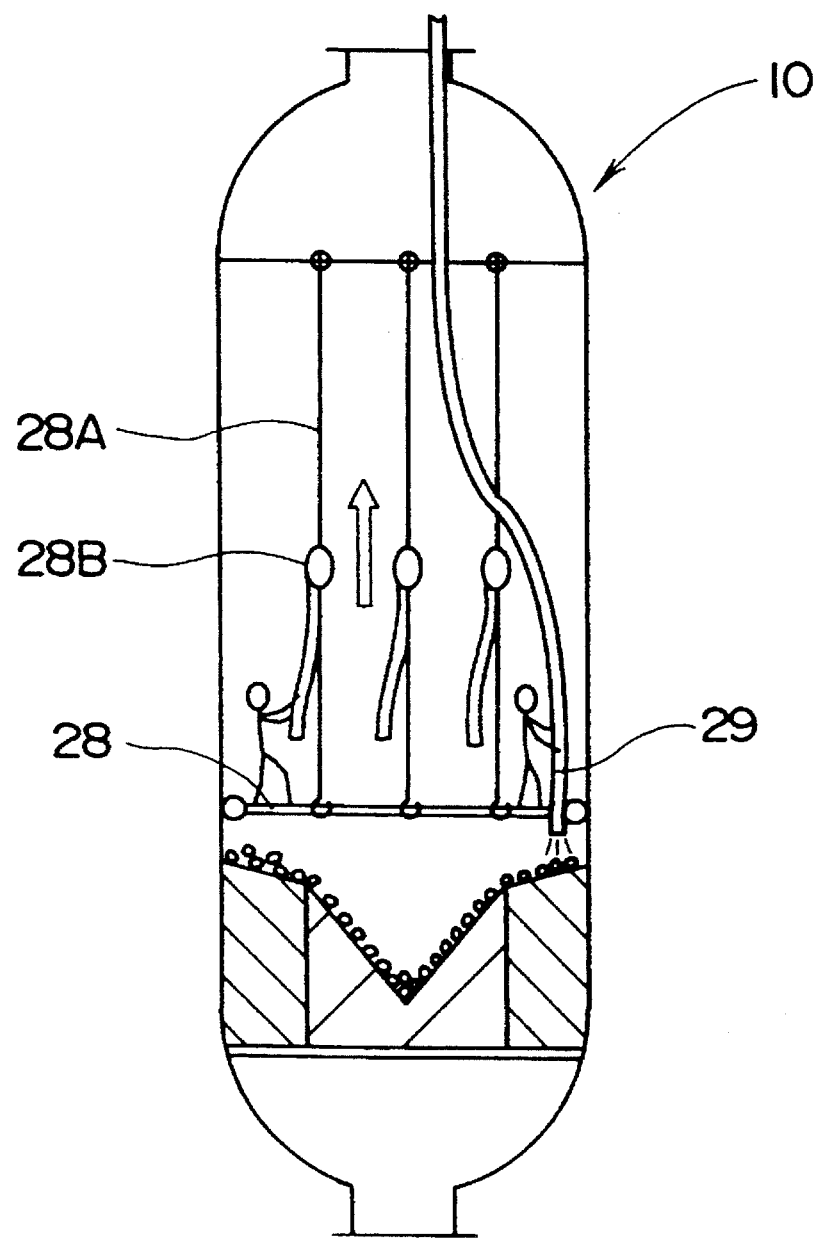
FIG. 6 is a view which illustrates the 4th modification of the catalyst loading method for the reactor of the 1st embodiment.

Further alternatively, a worker may enter inside to charge the catalyst. In this case, as shown in FIG. 6, a loading means may be used, which has a scaffold 28, which can be moved up and down in the reactor 10 by suspending it on the bottom end of a chain 28A hanging down from the top of the reactor 10 via a chain block 28B, and a flexible hose 29 which is connected to the external catalyst container of the reactor 10. To be specific, the worker on the scaffold 28 manually sprinkles the catalyst 16 discharged from the hose 29 along the inner surface of the reactor 10 in the first step, then moves the scaffold 28 upward in the second step.

Figure 7B:
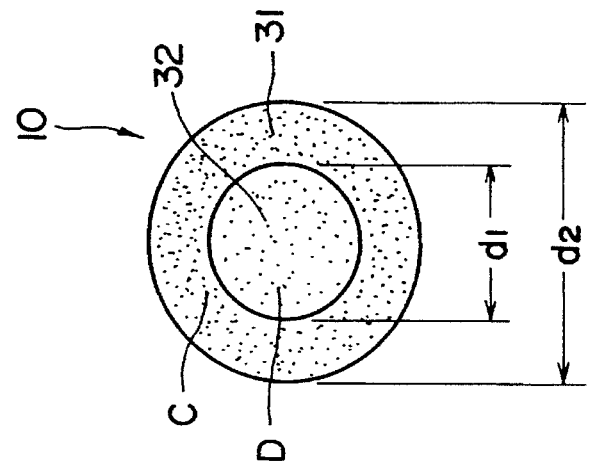
FIG. 7 (A) and FIG. 7 (B) are cross-sectional views which show a reactor of the 2nd embodiment of the present invention.
Figure 7A:
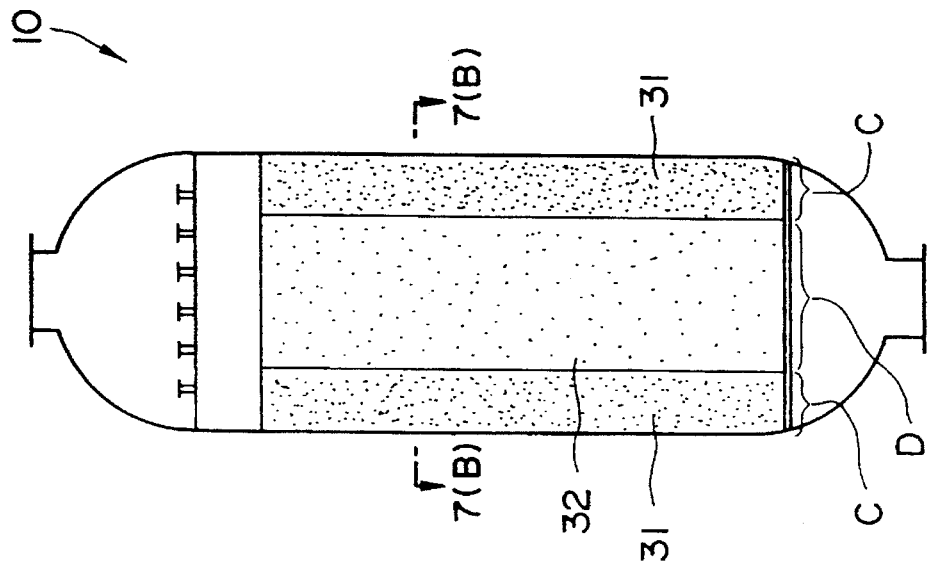

FIG. 7 (A) and FIG. 7 (B) show the 2nd embodiment of the present invention. In this embodiment, the outer built-up section A and the inner built-up section B, which differ in the loading density of the catalyst 16, in the 1st embodiment previously described are replaced by an outer built-up section C and an inner built-up section D which differ in the particle size of the catalyst. The structure and others of this embodiment are the same as those of the first embodiment discussed above; therefore, the explanation thereof will be omitted.

In FIG. 7 (A) and FIG. 7 (B), the outer built-up section C is filled with a small-particle catalyst 31 which has a relatively small particle size, while the inner built-up section D is filled with a large-particle catalyst 32 which has a larger particle size than the catalyst 31.

In this case, for the catalysts 31 and 32, particle diameters may be appropriately selected among $\frac{1}{32}$", $\frac{1}{20}$", $\frac{1}{16}$", $\frac{1}{10}$", ⅛", and ⅕". It is recommended, however, that a particle diameter, which is 1 to 3 levels smaller than that of the large-particle catalyst 32, be adopted for the small-particle catalyst 31. For instance, if the particle size of 1/32" is used for the small-particle catalyst 31, then the particle diameter of 1/16" to ⅛" should be adopted for the large-particle catalyst 32, the particle size of 1/16" or 1/10" being especially preferable.

A diameter d1 of the inner built-up section D which is filled with the large-particle catalyst 32 is set to a dimension which is 10% to 90% of an inside diameter d2 of the reactor 10.

Figure 8:
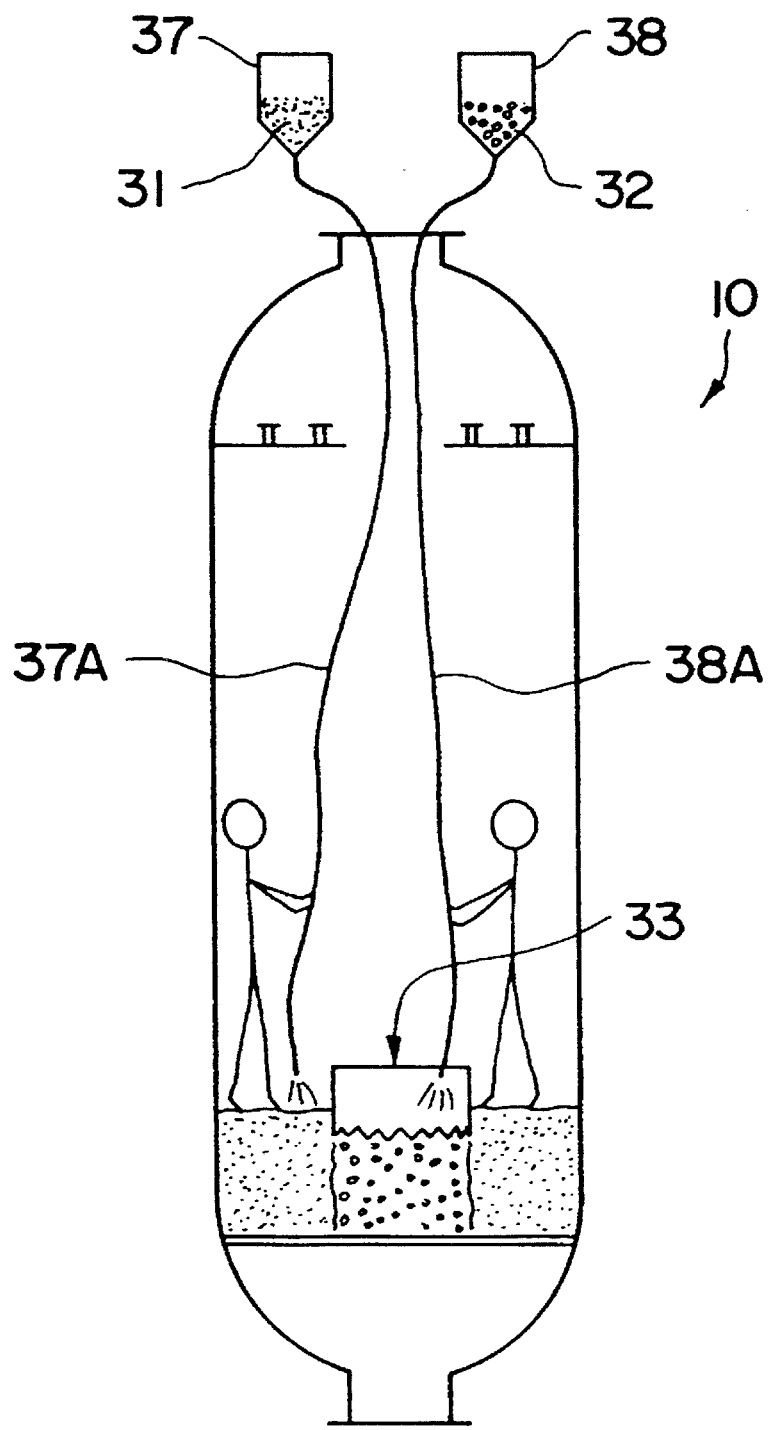
FIG. 8 is a view which illustrates the catalyst loading method for the reactor of the 2nd embodiment.

In such an embodiment, the catalysts 31 and 32 are charged as shown in FIG. 8.

A caisson 33, which serves as an auxiliary tool for loading and which is used in this embodiment, will be explained first.

Figure 9:
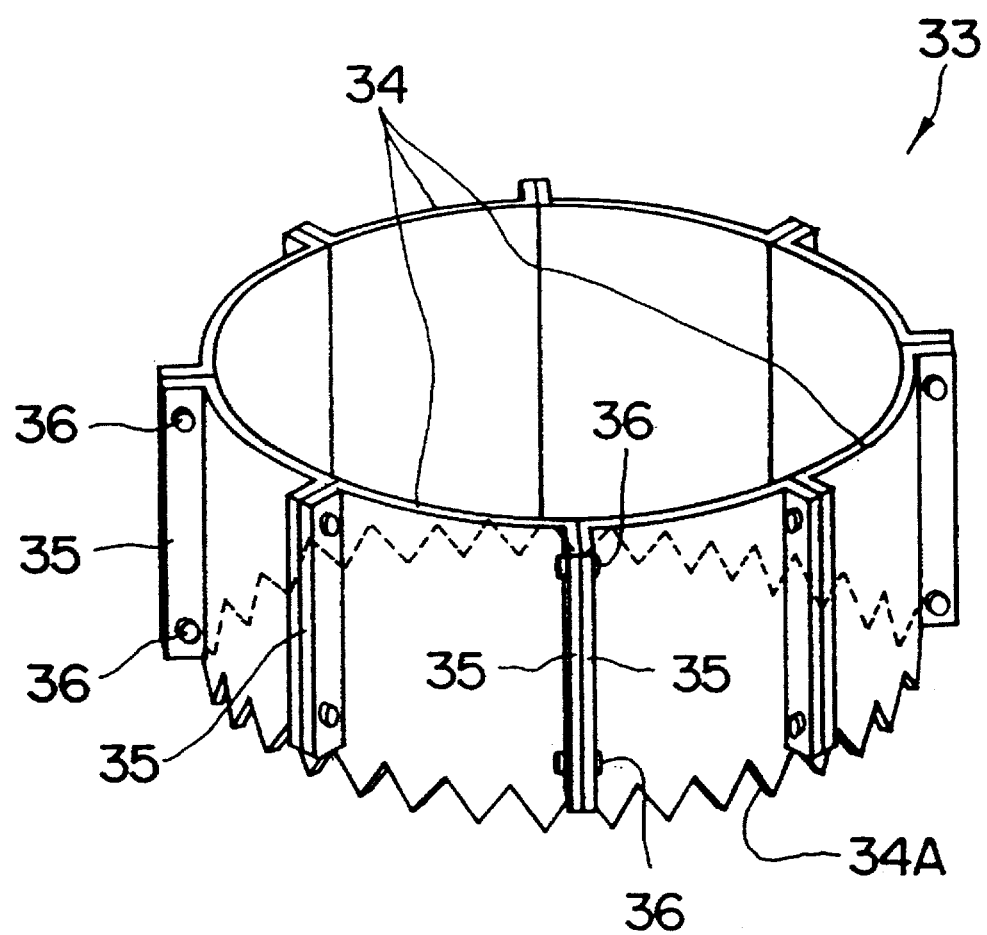
FIG. 9 is a perspective view which shows a auxiliary tool for loading which is used in the catalyst loading method of the 2nd embodiment.

The caisson 33 is a cylindrical component which is comprised primarily of a plurality of curved-surface members 34 as shown in FIG. 9. Each of the curved-surface members 34 is provided with a scalloped section 34A shaped like sawteeth, which is formed at the bottom edge thereof, and with flanges 35 on both side edges.

The curved-surface members 34 can be mutually connected by joining flanges 35 thereof by bolts 36.

Joining by the bolts 36 allows the caisson 33 to be disassembled and assembled so that it can be carded into the reactor 10 in a disassembled state, then assembled in the reactor. Further, the scalloped section 34A of the curved-surface member 34 functions to cause the catalysts 31 and 32 to be uniformly mixed in the vicinity of a boundary surface of the outer built-up section C and the inner built-up section D.

Referring back to FIG. 8, a procedure for loading the catalysts 31 and 32 will now be explained.

First, the caisson 33 is assembled and installed in the reactor 10. Then a hopper 37 filled with the small-particle catalyst 31 and a hopper 38 filled with the large-particle catalyst 32 are disposed above the reactor 10 and hoses 37A and 38A, which extend from the hoppers 37 and 38, respectively, are introduced into the reactor 10. The first step, wherein the small-particle catalyst 31 is charged into the area outside the caisson 33 and the large-particle catalyst 32 is charged into the area inside the caisson 33 through the hoses 37A and 38A, is carried out.

Then, when the caisson 33 has been buffed by the charged catalysts 31 and 32 up to the vicinity of the top end thereof, the second step, wherein the buried caisson 33 is pulled upward, is implemented. Further, the first step, wherein the areas inside and outside the caisson 33 are filled with the catalyst 31 and the catalyst 32, respectively, is carried out again.

Thus, the first step for loading the catalysts 31 and 32 and the second step for drawing up the caisson 33 are repeated by a plurality of times until the reactor 10 is filled with the catalysts 31 and 32 to the predetermined height.

In this embodiment also, the pressure drops of the outer built-up section C and the inner built-up section D can be made approximately equal by using a particle size, which is smaller than that of the catalyst 32, for the catalyst 31; therefore, the similar action and effect to those in the 1st embodiment discussed above are obtained. There is an additional effect in that the pressure drop of the outer built-up section C and that of the inner built-up section D can be independently adjusted by changing the particle diameters of the catalysts 31 and 32.

The present invention is not limited to the 2nd embodiment discussed above but it comprises modifications including the following modification.

Specifically, the auxiliary tool for loading is not restricted to the cylindrical caisson 33 but it may be, for example, a cylindrical auxiliary tool having a rectangular or hexagonal cross section; there is no restrictions on the shape as long as it is cylindrical.

Figure 10B:
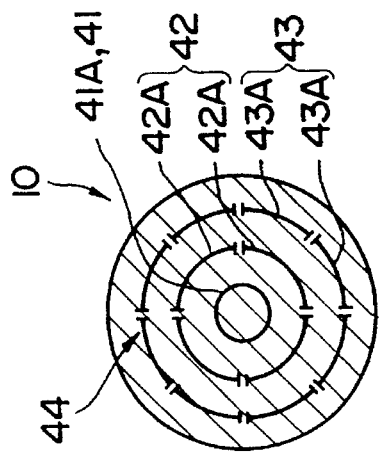
FIG. 10 (A) and FIG. 10 (B) are cross-sectional views which show a reactor of the 3rd embodiment of the present invention.
Figure 10A:
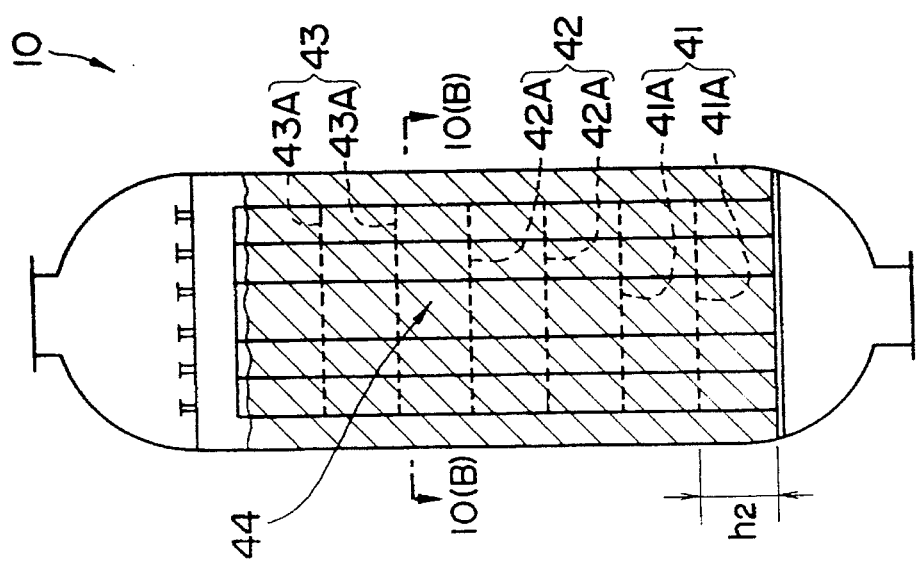

FIG. 10 (A) and FIG. 10 (B) show the 3rd embodiment of the present invention. In this embodiment, the inner built-up section, the flow resistance thereof is reduced by changing the density or the particle diameter of the catalysts as in the 1st and 2nd embodiments described above, is replaced by an inner built-up section, wherein the flow resistance thereof is reduced by means of rectifying sections 41 through 43 which extend vertically.

More specifically, inside the reactor 10 are provided cylindrical rectifying sections 41 through 43, which have different diameters, so that they are coaxial with the reactor 10.

The rectifying section 43 among the rectifying sections 41 through 43 is installed innermostly and it is comprised of rectifying members 41A which are a plurality of ring-shaped block members. These rectifying members 41A are piled vertically and joined together.

The rectifying section 42 is installed surrounding the rectifying section 41 and it is comprised of rectifying members 42A which are a plurality of arc block members. These rectifying members 42A are joined to each other and assembled into a ring, and a plurality of the rings are piled and joined vertically.

The rectifying section 43 is installed surrounding the rectifying section 42 and it is comprised of rectifying members 43A which are a plurality of arc block members. These rectifying members 43A are joined to each other and assembled into a ring, then a plurality of the rings are piled and mutually joined vertically as in the case of the rectifying member 42A.

The height of the rectifying members 41A, 42A, and 43A may range from 0.3 m to 1.0 m mainly for the purpose of easy operation in the reactor 10.

Further, the material type and the thickness of the rectifying members should be selected so that they can be crushed together with a catalyst 44 and discharged to the outside when the used catalyst 44 is removed from the reactor 10 and also are resistant to pressure, temperature, etc. during operation. As an example, an organic compound such as vinyl, paper or a metal such as titanium may be employed.

Figure 11:
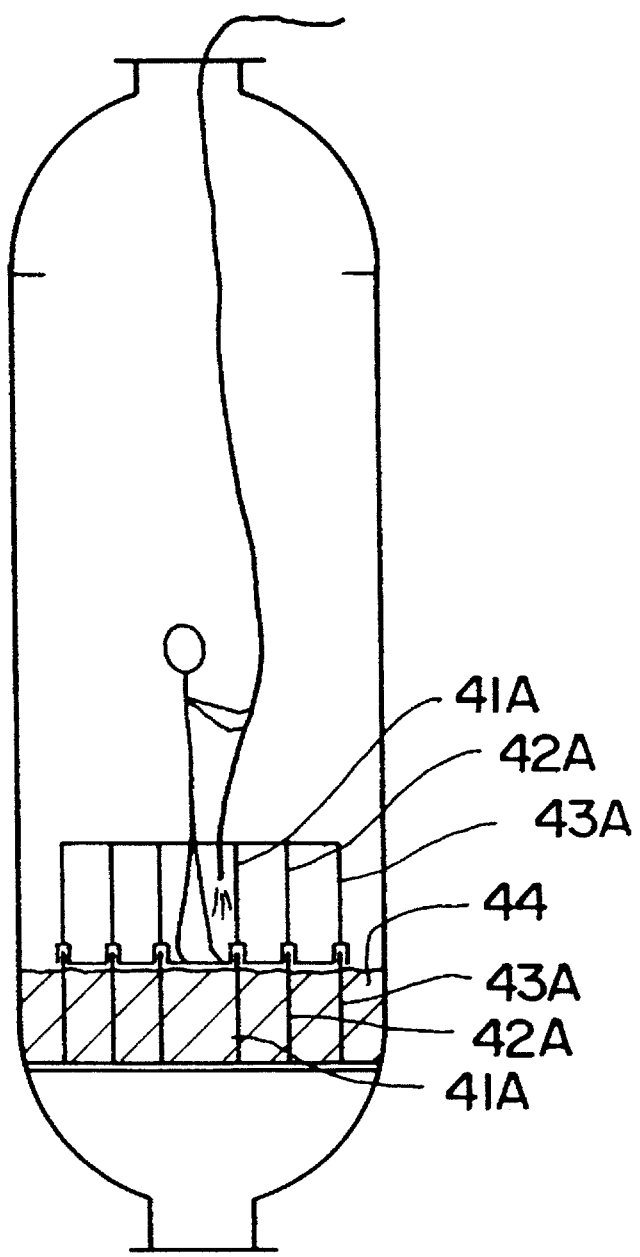
FIG. 11 is a view which illustrates the catalyst loading method for the reactor of the 3rd embodiment.

In this embodiment, the catalyst 44 is charged as shown in FIG. 11.

Specifically, after the first set of rectifying members 41A, 42A, and 43A are carried into the reactor 10, the rectifying members 42A and 43A are assembled into the rings, and all the rectifying members 41A, 42A, and 43A are installed coaxially on the bottom section of the reactor 10.

Subsequently, the first step, wherein the catalyst 44 is charged up to the vicinity of the top ends of the rectifying members 41A, 42A, and 43A, is completed, then the second step, wherein another set of the rectifying members 41A, 42A, and 43A are spliced onto the installed rectifying members 41A, 42A, and 43A, is carded out. After the completion of the second step, the first step for loading the catalyst 44 is implemented.

Thus, the first step for loading the catalyst 44 and the second step for splicing the rectifying members 41A, 42A, and 43A are repeated successively until the catalyst 44 is charged up to the predetermined height of the reactor 10.

According to this embodiment, the channeling phenomenon caused by the rectifying sections 41 through 43 reduces the flow resistance of the catalyst 44 of the inner built-up section which is not in contact with the side wall of the reactor 10; therefore, the same effects as those in the 1st and the 2nd embodiments described above can be obtained. In addition, the use of the shorter and smaller rectifying members 41A, 42A, and 43A makes it possible to form the rectifying sections 41 through 43, which nearly reach the top of the reactor 10, even if an inlet and an outlet for communicating the inside and outside of the reactor 10 are small. Furthermore, the splicing work, which is performed on the charged catalyst 44, presents a work effect which enables the rectifying sections 41 through 43 to be securely installed in the reactor 10 even if no scaffold or the like can be assembled inside.

The present invention is not restricted to the 3rd embodiment discussed above but it also comprises such modifications as the one shown below.

Figure 12B:
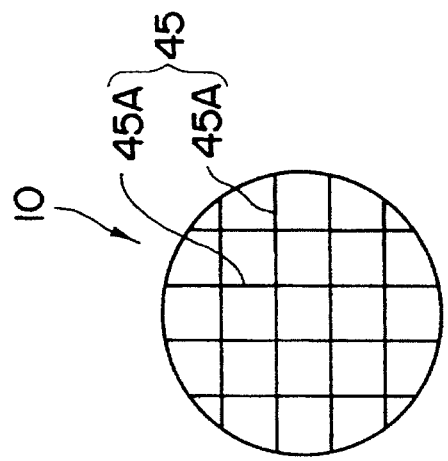
FIG. 12 (A) and FIG. 12 (B) are cross-sectional views which show a modification of the reactor of the 3rd embodiment.
Figure 12A:
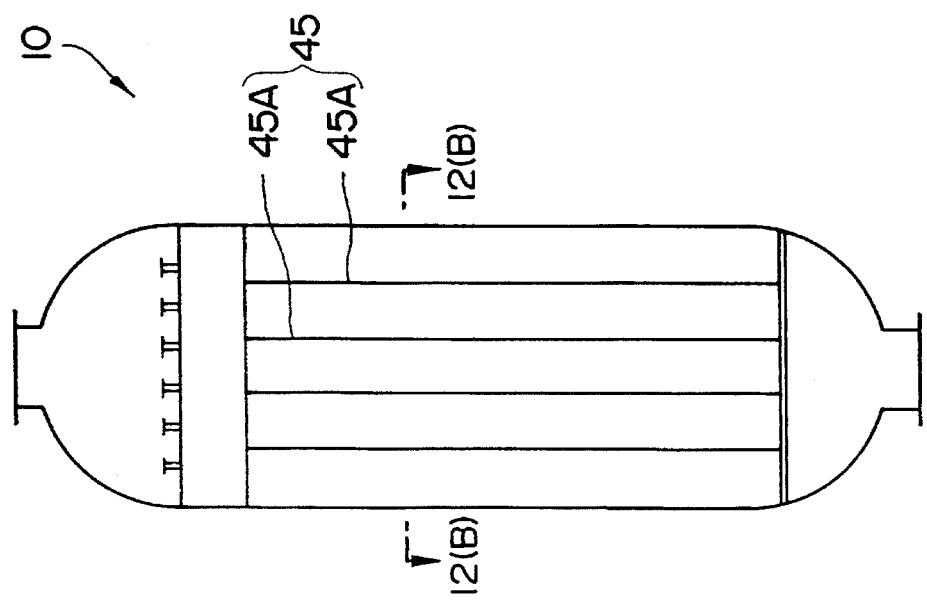

Specifically, the rectifying sections in the 3rd embodiment described above are not limited to the rectifying sections 41 through 43, which are coaxially installed; instead, they may be, for example, a rectifying section 45 comprising flat materials 45A, which are arranged so that the cross section thereof is a grid, as shown in FIG. 12 (A) and FIG. 12 (B), or a rectifying section 46, on which a plurality of pipes 46A are installed and arranged longitudinally and laterally as shown in FIG. 13 (A) and FIG. 13 (B).

What is claimed is:

1. A catalyst loading structure for a reactor, which enables a fluid to be subjected to a chemical reaction pass through a cylindrical interior of the reactor extending vertically and accelerates the chemical reaction of said fluid by a granular catalyst charged inside, comprising:

said catalyst;

a rectifying section which extends from a top of the reactor toward the bottom thereof;

an outer built-up section being constructed of said catalyst which is loaded and vertically built up along an inside periphery of the cylindrical reactor;

an inner built-up section being constructed of said catalyst which is loaded and vertically built up inside said outer built-up section and vertically partitioned from said outer built-up section with said rectifying section;

wherein the flow resistance of said inner built-up section is reduced to a value which is substantially equal to the flow resistance of said outer built-up section to prevent the occurrence of a deflected flow phenomenon; and wherein the rectifying section is comprised of block materials of a prescribed height, which are connected vertically, the height of a block member ranging from 30 cm to 100 cm.

2. The catalyst loading structure for a reactor according to claim 1, wherein said rectifying section is comprised of a plurality of cylindrical parts which have different diameters and which are disposed coaxially with said reactor.

3. The catalyst loading structure for a reactor according to claim 1, wherein said rectifying section has a plane cross section in the shape of a grid.

4. The catalyst loading structure for a reactor according to claim 1, wherein said rectifying section is comprised of a plurality of pipes which are disposed so that pipes of said plurality of pipes are parallel to one another.

5. A method of charging a catalyst loading structure into a reactor which enables a fluid to be subjected to a chemical reaction passed through a cylindrical interior of the reactor extending vertically and accelerates the chemical reaction of the fluid with a granular catalyst charged inside, said catalyst loading structure including said catalyst; an outer built-up section constructed of said catalyst; an inner built-up section constructed of said catalyst, comprising the steps of:

utilizing a loading means designed to release said catalyst in said reactor to form said outer built-up section which is loaded and vertically built-up along an inside periphery of the cylindrical reactor, and wherein said inner built-up section is loaded and vertically built-up inside said outer built-up section to charge the catalyst inside said reactor; and wherein charging occurs such that the flow resistance of the inner built-up section is reduced to a value which is substantially equal to the flow resistance of the outer built-up section to prevent the occurrence of a deflected flow phenomenon.

6. The method according to claim 5, wherein, the catalyst is built up cylindrically along the inner side surface of the reactor to form the outer built-up section only to a predetermined height and the catalyst, which has accumulated in the cylindrical outer built-up section, falls naturally to fill the cylindrical interior with the falling catalyst, thereby forming the inner built-up section.

7. The method according to claim 5, wherein the catalyst is charged into the outside area by cylindrical auxiliary tool for loading of a predetermined height which is disposed inside the reactor to form the outer built-up section to a predetermined height and a catalyst of a particle size, which is larger than that of said outer built-up section, is charged into the inner side area of said auxiliary tool for loading in order to form the inner built-up section only to a predetermined height.

8. The method according to claim 5, wherein, block members comprising a rectifying section, which vertically partitions said inner built-up section and which is divided to said predetermined height, are installed on the bottom of the reactor and the catalyst is charged to the vicinity of the top ends of the block members, and another set of block members are spliced to said block members, which have been buried in the catalyst to the vicinity of the top ends.

9. The method according to claim 5, wherein said loading means has a rotary disc, said catalyst is continuously supplied to a central part of the disc, and said catalyst is spread and sprinkled toward the inner side surface of said reactor by the centrifugal force of said disc, and in a second step, the direction of said catalyst, which is released, is moved upward by increasing the number of revolutions of said loading means.

10. The method according to claim 5, wherein said loading means has a rotary disc, said catalyst is continuously supplied to a central part of the disc, and said catalyst is spread and sprinkled toward the inner surface of said reactor by the centrifugal force of said disc, and in a second step, the said loading means is moved upward.

11. The method according to claim 5, wherein said loading means has a pipe, which is bent into a crank shape, and a supporting means, which journals one end of the crank-shaped pipe in the central axial position of said reactor so that the other end is allowed to rotate along the inner side surface of said reactor, said catalyst being built up along the inner side surface of said reactor by continuously supplying said catalyst to the inside of said pipe while rotating said pipe, and said pipe is moved upward in a second step.

12. The method according to claim 5, wherein said loading means has a catalyst disloading port, which is allowed to rotate along the inner side surface of said reactor, a driving means for rotating the catalyst disloading port, and a hose for connecting said catalyst disloading port to an external catalyst container of said reactor, the catalyst being built up along the inner side surface of said reactor by letting said catalyst discharge through said catalyst disloading port which is rotated, and said loading means being moved upward in the second step.

13. The method according to claim 5, wherein said loading means is provided with a scaffold, which is installed so that it can be moved up and down in said reactor, and a flexible hose which is connected to the external catalyst container of said reactor, a worker on said scaffold manually sprinkles said catalyst discharged from said hose along the inner side surface of said reactor in the first step, and said scaffold is moved upward in the second step.

* * * * *